US011857036B1

(12) United States Patent
Casalinova (10) Patent No.: US 11,857,036 B1
(45) Date of Patent: Jan. 2, 2024

(54) HUNTING BRACELET (71) Applicant: Mark Joseph Casalinova, Murfreesboro, TN (US)

(72) Inventor: Mark Joseph Casalinova, Murfreesboro, TN (US)

( * ) Notice: Subject to any disclaimer, the term of this patent is extended or adjusted under 35 U.S.C. 154(b) by 111 days.

(21) Appl. No.: 17/559,065

(22) Filed: Dec. 22, 2021

(51) Int. Cl.
*A01M 31/02* (2006.01)
*A45F 5/00* (2006.01)
*A44C 5/00* (2006.01)
*A01M 31/00* (2006.01)

(52) U.S. Cl.
CPC ............ *A44C 5/0007* (2013.01); *A01M 31/00* (2013.01); *A01M 31/025* (2013.01); *A45F 2005/008* (2013.01)

(58) Field of Classification Search
CPC .. A01M 31/025; A44C 5/0046; A44C 5/0007; A45F 2005/008
USPC ......... 224/219–222, 267; 248/274.1, 288.11, 248/316.7, 218.4; 40/658, 647, 639, 40/607.14, 586; 2/311, 312, 318
See application file for complete search history.

(56) References Cited

U.S. PATENT DOCUMENTS

| | | | |
|---|---|---|---|
| 3,550,824 A * | 12/1970 | Bohanski | F21V 21/08 D11/20 |
| 4,817,579 A | 4/1989 | Mathias | |
| 4,847,729 A * | 7/1989 | Hee | A61N 1/14 224/220 |
| 5,579,969 A * | 12/1996 | Brandell | B60R 7/081 40/658 |
| 5,601,356 A * | 2/1997 | McWilliams | F21L 4/005 224/267 |
| 5,845,889 A * | 12/1998 | Suzuki | A47B 21/045 40/658 |
| 6,056,173 A * | 5/2000 | Gillespie | A45F 5/10 24/3.12 |
| 7,036,778 B2 * | 5/2006 | Ferrell | G09F 23/08 40/658 |
| 8,272,158 B1 * | 9/2012 | Ball | A45F 5/00 224/101 |
| 8,323,756 B2 | 12/2012 | Peterson | |
| 8,769,860 B2 | 7/2014 | Bain | |
| 9,877,473 B2 | 1/2018 | Bartel | |
| 10,477,858 B2 | 11/2019 | Pauley | |
| 10,952,512 B2 * | 3/2021 | Cox | A44C 15/003 |
| 10,980,227 B1 | 4/2021 | Bednar | |
| 11,051,643 B1 * | 7/2021 | Stephens | A41F 17/00 |

(Continued)

OTHER PUBLICATIONS

Black Feather Flair Cuffs—Costume Feather Wrist Cuffs, Ankle Cuffs, Arm Cuffs for Halloween, Carnival, Festival Wear & Burning Man, sold by ZuckerFeatherPlace on Etsy, listed on Aug. 17, 2021.

*Primary Examiner* — Justin M Larson
(74) *Attorney, Agent, or Firm* — Shane Cortesi (57) ABSTRACT

Bracelets used for hunting and other purposes may include a band and a clip attached to the band by a clip fastener. The clip fastener may include a glide bracket attached to the band and an L-shaped bracket with a horizontal arm located in a track of the glide bracket and a vertical arm attached to a clip arm of the clip. A pivot arm with a pivot axis may attach the horizontal arm to the vertical arm to allow the clip to pivot toward and away from the band. The clip may hold a tail of turkey feathers or a blind. In addition, stands using the L-shaped bracket and clip are also described.

12 Claims, 11 Drawing Sheets

(56) References Cited

U.S. PATENT DOCUMENTS

| | | | |
|---|---|---|---|
| 11,058,104 B1 | 7/2021 | Cain, Jr. | |
| 11,783,732 B2 * | 10/2023 | Gonzalez | G09F 3/20 |
| | | | 248/274.1 |
| 2008/0006659 A1 | 1/2008 | Cain | |
| 2013/0331240 A1 * | 12/2013 | Blodgett | A63B 23/1209 |
| | | | 482/105 |
| 2014/0130396 A1 | 5/2014 | Yaron | |
| 2015/0040287 A1 | 2/2015 | Miller | |
| 2015/0164204 A1 * | 6/2015 | Moreau | A45F 5/00 |
| | | | 224/267 |
| 2016/0050905 A1 * | 2/2016 | Owen | A01M 31/006 |
| | | | 224/103 |
| 2022/0000192 A1 * | 1/2022 | Musser | A41D 13/0025 |

* cited by examiner

HUNTING BRACELET

BACKGROUND

Technical Field

The present invention relates to bracelets that may be used for turkey hunting and other purposes. Stands for displaying feathers on a mantel are also disclosed.

Background of the Invention

There is a need in the art for hands free devices for hunting and other purposes.

U.S. Patent Publication No. 2008/0006659 is directed to a garter that may have ornamentation, such as flowers or feathers, attached to the outside. The garter may be worn around the ankle, wrist, bicep, etc. There is no discussion that the garter may include a clip or is configured to hold a fan of turkey tail feathers.

U.S. Patent Publication No. 2014/0130396 teaches a reflective decoy with a mirror and a fan of turkey tail feathers. The decoy slides over the barrel of a firearm or attaches to a bow using a bracket. The feathers are attached to the bracket using, for example, hook and loop fasteners.

U.S. Pat. No. 11,058,104 teaches a bow or gun-mounted turkey decoy. The fan of turkey tail feathers is coupled to the weapon using a fan bracket 94.

U.S. Pat. No. 10,980,227 also teaches a gun-mounted hunting decoy, where the feathers may be attached using, for example, hook and loop fasteners.

Many of the aforementioned devices are overly bulky. Thus, there is a continuing need for compact, easy-to-use accessories for hunting and other applications that allow a user to hold multiple items (e.g., a fan of turkey tail feathers or a blind and a weapon, such as a bow or firearm).

SUMMARY OF THE INVENTION

The present disclosure provides bracelet and stands as described herein.

DETAILED DESCRIPTION

With reference to FIGS. 1-14, the present disclosure provides a bracelet designated by the numeral 10. In the drawings, not all reference numbers are included in each of the drawings for the sake of clarity. FIGS. 1-14 are drawn generally to scale, however, it will be appreciated that other dimensions are possible.

As shown in FIGS. 1-14, the bracelet 10 may include a circular band 12 that wraps around/forms a loop 26 around the wrist of a human user. The circular band 12 may have a band length 14 that encircles the wrist, and a band width 16 perpendicular to the length. The band length 14 may be greater than the band width 16, and the loop 26 is preferably dimensioned to fit a human wrist. As known to those of ordinary skill, diameters of bracelets are typically in the range of from about 5 inches to about 9 inches, however, other sizes are possible.

Preferably, the bracelet 10 is adjustable, fits snugly to the wrist (so that the bracelet 10 and attached clip 18 do not move on the wrist) and is easily removable. For example, as shown in the exemplary embodiment, the band 12 is in the form of a strap 52 and comprises a first strap end 54 and a second strap end 56 and the first strap end 54 is releasably attached to the second strap end 56 by a strap fastener 58. In an exemplary embodiment, the strap fastener 58 is an alligator clip or other quiet fastener so that fastening the strap fastener 58 does not disturb any game. The strap fastener 58 may also be a hook and loop fastener.

In another embodiment, the bracelet 10 may be fastened to another body part or object such as a backpack.

As shown in the illustrated embodiment, the bracelet 10 preferably further includes a clip 18 that may include a first clip arm 20 and a second clip arm 22, as well as a clip fastener 24 attaching the clip 18 to the band 12. The clip 18 preferably extends outwardly away from the wrist and the loop 26, as shown in FIGS. 1, 2, 4, 5-9 and 12-13. More preferably, the clip 18 extends radially outward in FIGS. 1, 2, 4, 6-9 and 12-13.

Figure 1:
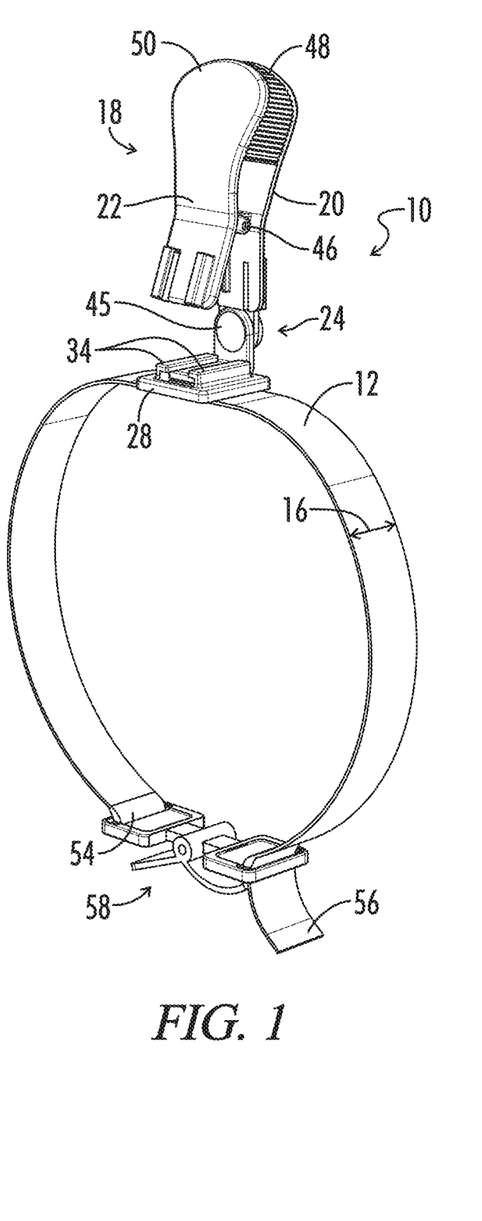
FIG. 1 illustrates a rear perspective view of a bracelet of one embodiment of the invention.
Figure 2:
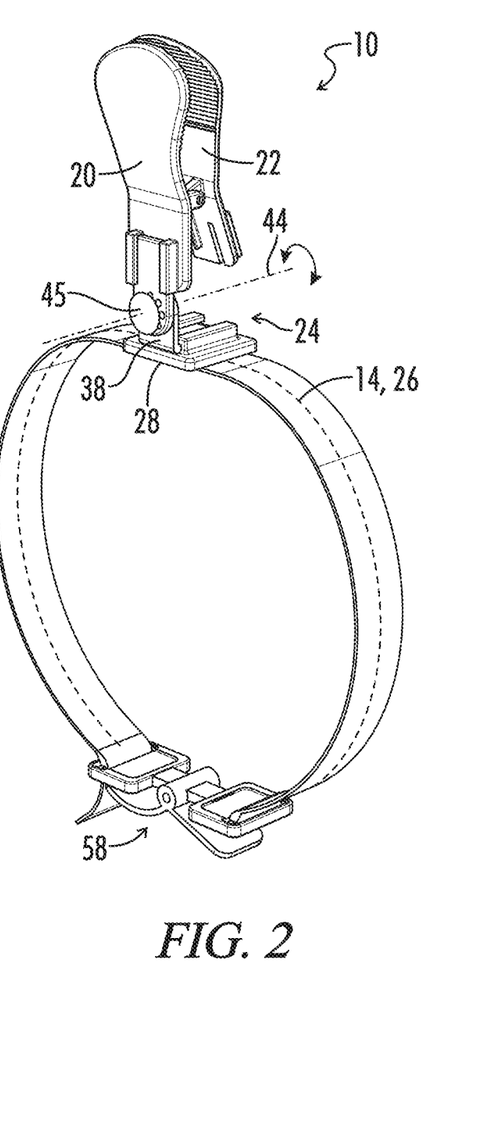
FIG. 2 illustrates a front perspective view of the bracelet of FIG. 1.
Figure 3:
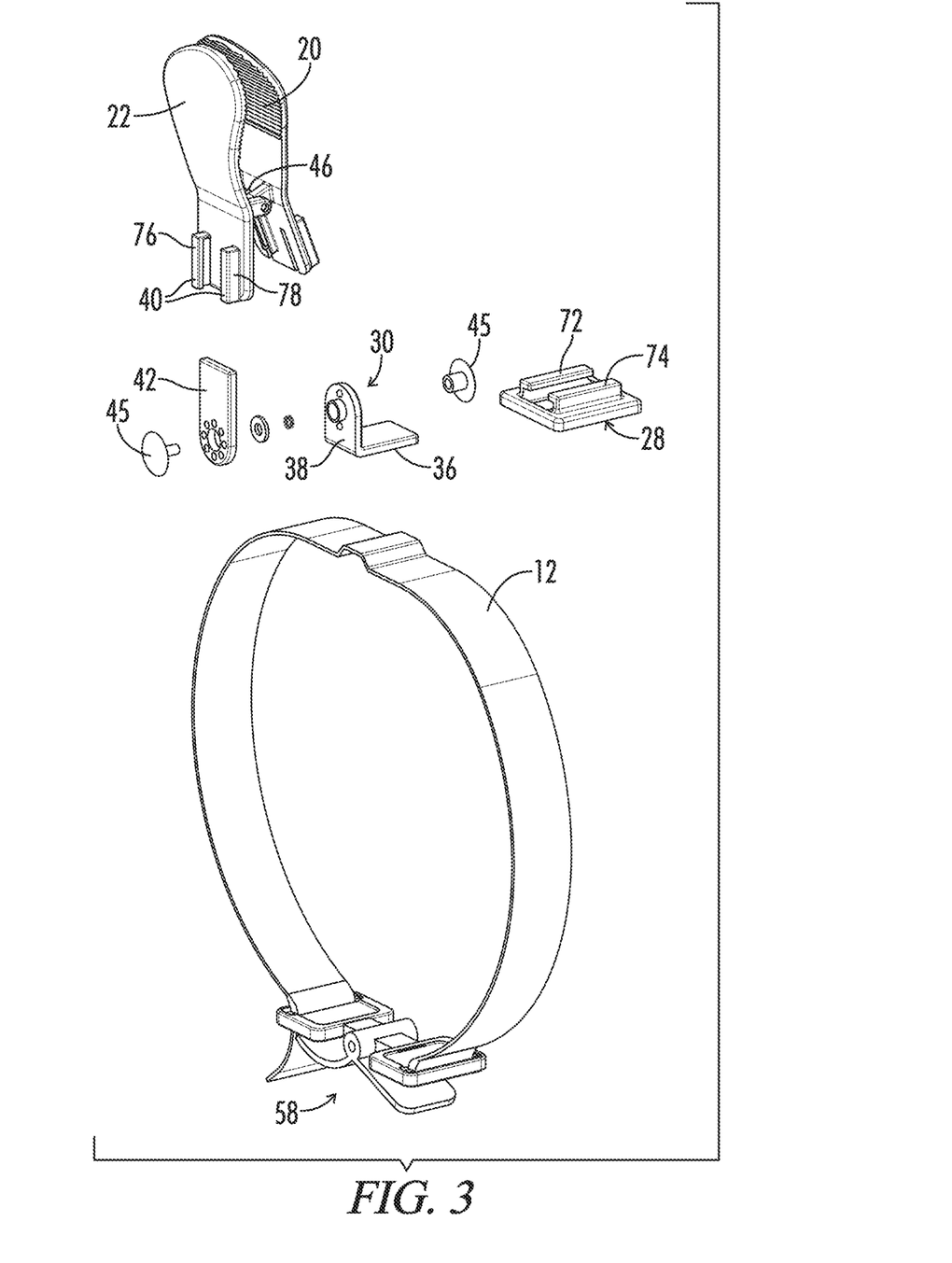
FIG. 3 illustrates a front exploded, perspective view of the bracelet of FIG. 1.
Figure 4:
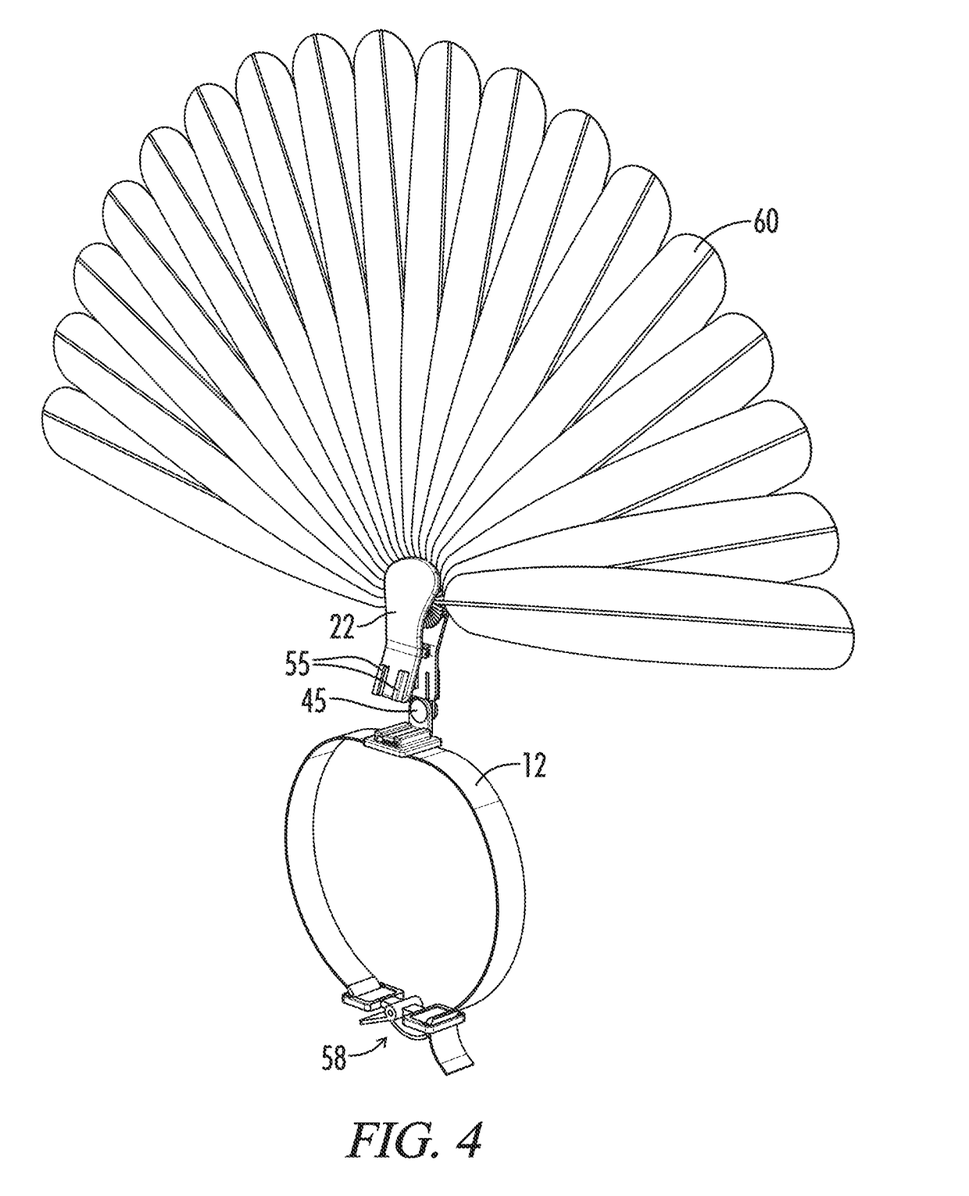
FIG. 4 illustrates a rear perspective view of the bracelet of FIG. 1 holding a fan of turkey tail feathers.
Figure 5:
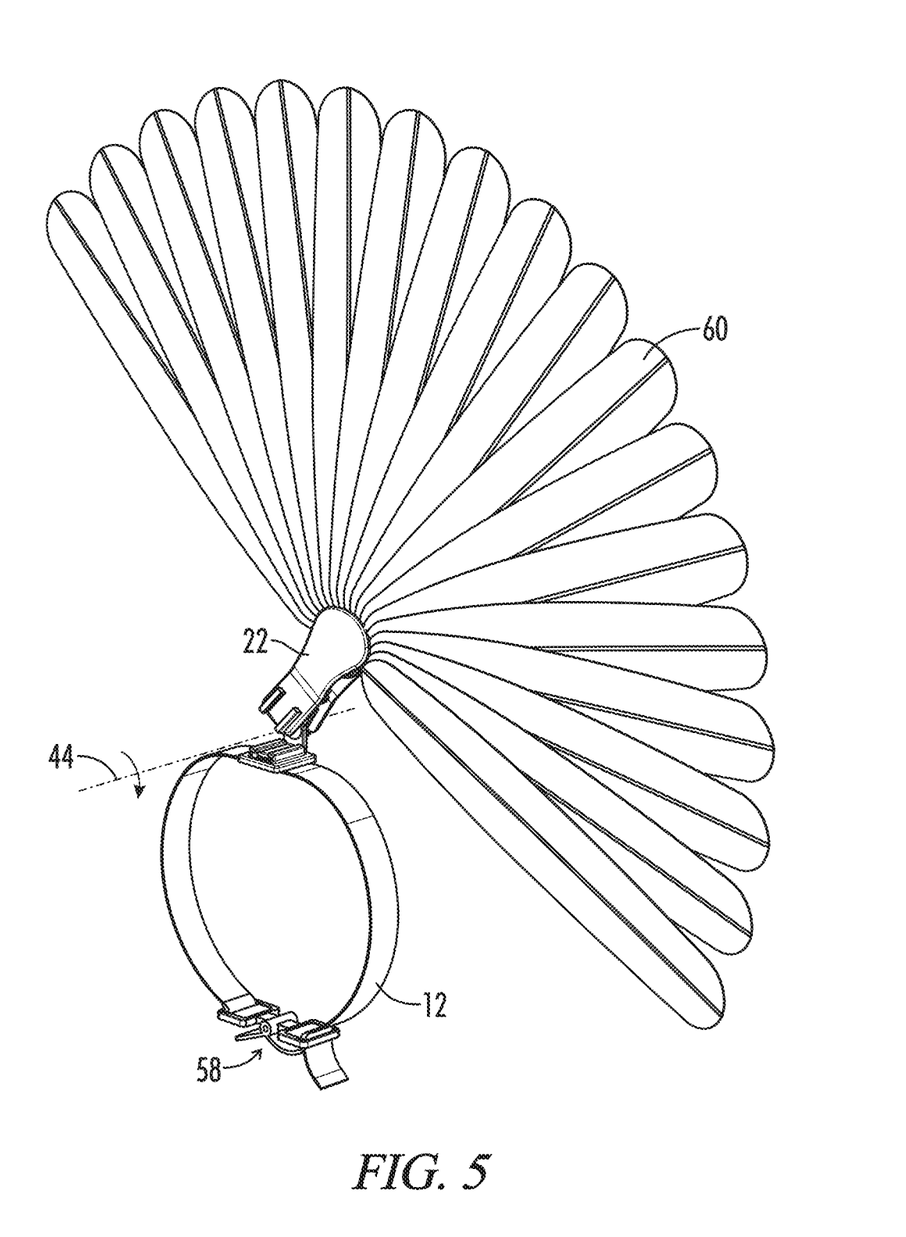
FIG. 5 illustrates a rear perspective view of the bracelet of FIG. 1 holding a fan of turkey tail feathers with the clip in a pivoted/tilted position relative to FIG. 4; the directional arrow shows how the clip has been tilted about the pivot axis.
Figure 6:
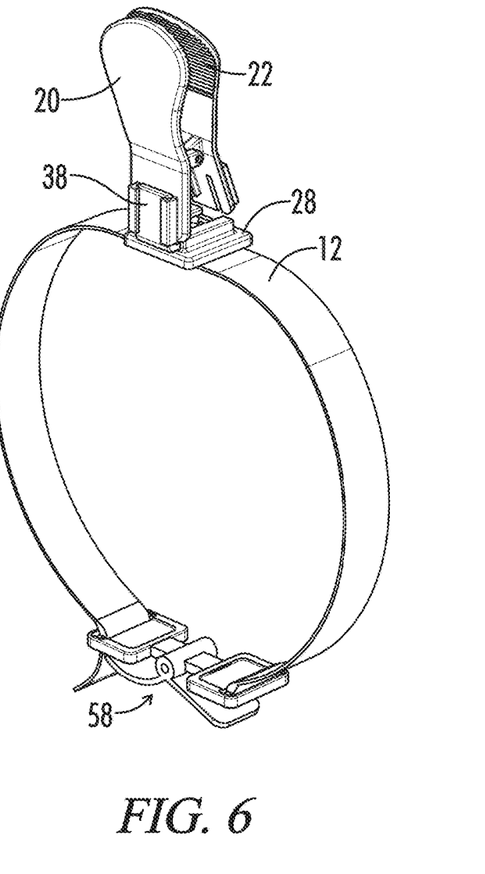
FIG. 6 illustrates a front perspective view of a bracelet of another embodiment of the present invention that does not include the moment arm/pivot arm.
Figure 7:
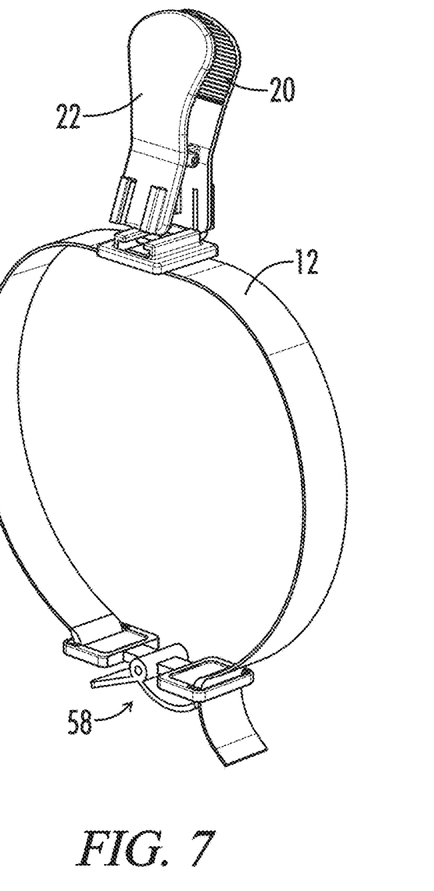
FIG. 7 illustrates a rear perspective view of the bracelet of FIG. 6.
Figure 8:
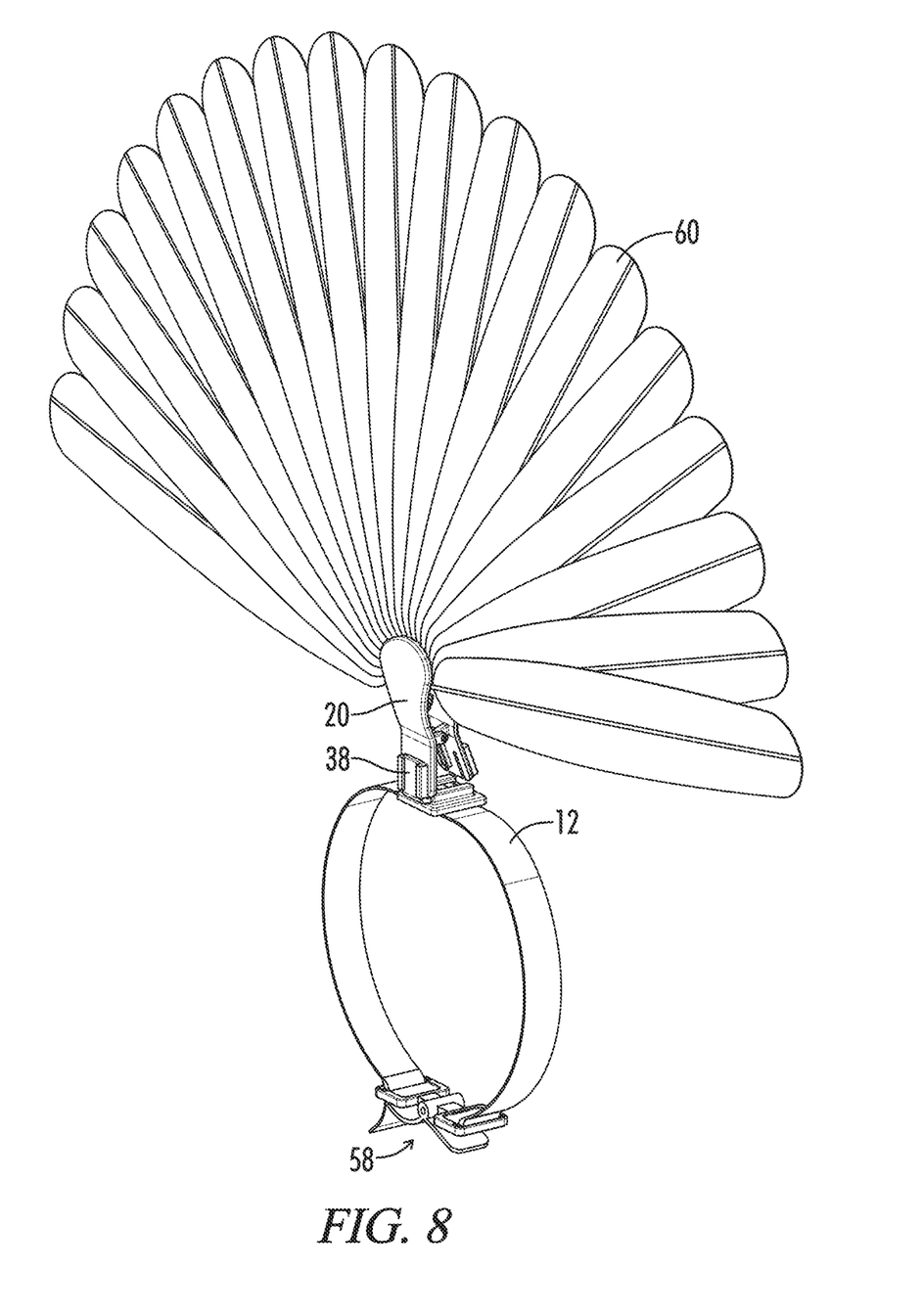
FIG. 8 illustrates a front perspective view of the bracelet of FIG. 6 holding a fan of turkey tail feathers.
Figure 9:
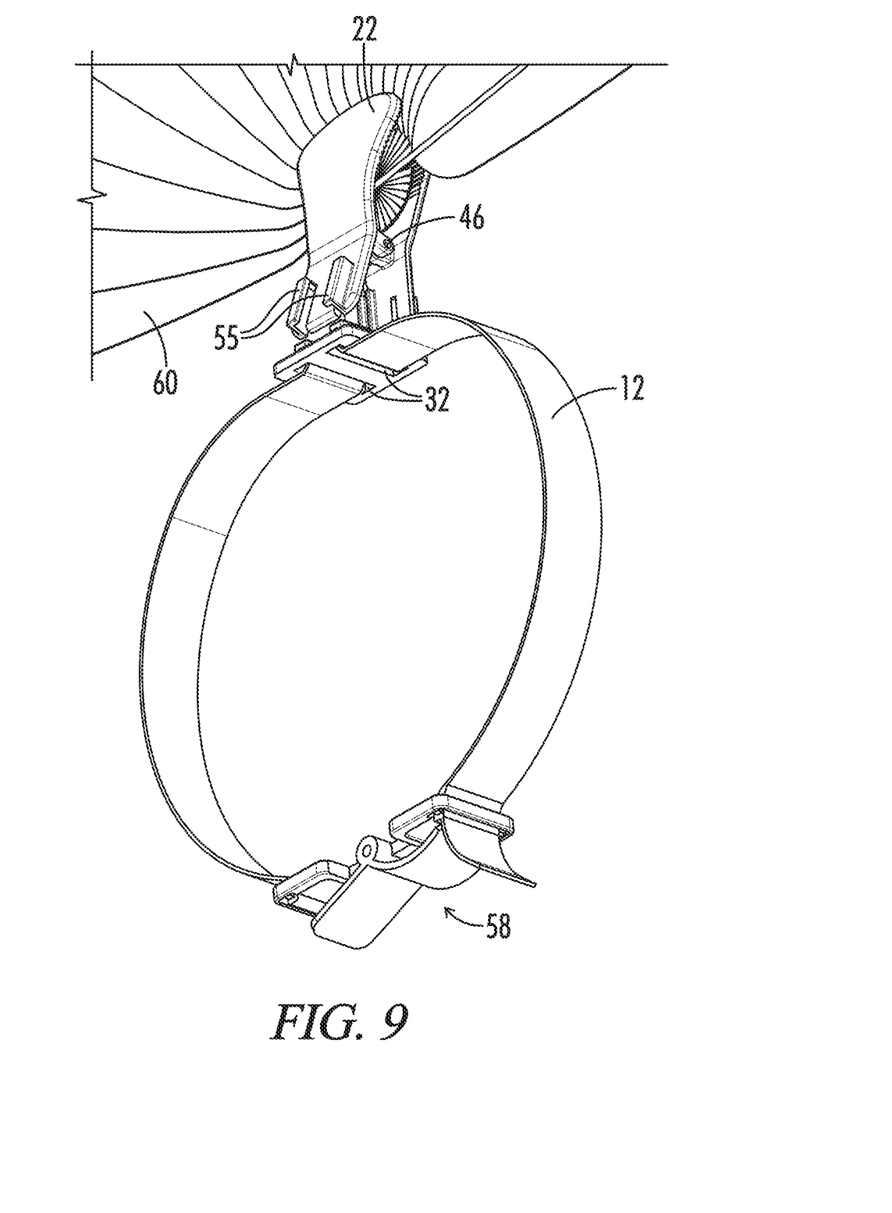
FIG. 9 illustrates a front, bottom perspective view of the bracelet of FIG. 6 holding a fan of turkey tail feathers.

Optionally, the clip fastener 24 removably attaches the clip 18 to the band 12 so that the clip 18 is removable from the band 12. For example, in the illustrated embodiments, the clip fastener 24 comprises a glide plate/bracket 28 and an L-shaped bracket 30. The glide plate 28 may be similar to, for example, a glide in a pair of suspenders and may comprise a glide plate aperture 32 receiving the circular band 12 to allow the glide plate 28 to slide at least partially around the band length 14 to position the clip 18 in the desired location. The glide plate 28 may also include a receptacle such as a glide plate track 34 located lateral to/outside the loop 26. Optionally, as shown in the illustrated embodiment, the glide plate track 34 includes two rails 72 and 74 that are parallel to the band width 16. The L-shaped bracket 30 may include a horizontal arm 36 located in the glide plate track 34 and a vertical arm 38 extending away from the horizontal arm 36 at an angle of approximately 90 degrees and connected (directly or indirectly) to the clip 18. Optionally, the clip 18 extends away from the loop 26 perpendicular to the band length 14, as shown in FIGS. 1, 2, 4, 6-9 and 12-13. Alternatively, the clip 18 may be tilted, as shown in FIG. 5. Though the glide plate 28 may be positioned anywhere, optionally the glide plate 28 is positioned opposite the strap fastener 58.

Optionally, the first clip arm 20 further comprises a receptacle such as a clip arm track 40 receiving the vertical arm 38. Optionally, as shown in the illustrated embodiment, the first clip arm track 40 is comprised of two rails 76 and 78 that are parallel to each other and perpendicular to glide plate rails 72 and 74. Optionally, if it is desired to have the clip 18 tilt as shown in FIG. 5, the clip fastener 24 may further include a pivot arm/moment arm 42 pivotably connected to the L-shaped bracket 30 by pivot pin 45 and moveable about a pivot axis 44 oriented perpendicular to the band width 16. Optionally, the first clip arm 20 further comprises a clip arm track 40 receiving the pivot arm 42. Optionally, the first clip arm 20 and the second clip arm 22 each comprise a top 48,50 and the clip 18 further comprises a spring 46 biasing the second clip arm top 50 toward the first clip arm top 48. Optionally, as shown in the illustrated embodiment, the second clip arm 22 includes a receptacle such as a clip arm track 55.

The aforementioned components may be made of any suitable material. In some embodiments, the components are plastic so that the bracelet 10 is quiet and does not disturb game. In addition, the aforementioned components that are described as separate parts (e.g., the glide plate 28 and L-shaped bracket 30) may be combined into a single part.

Exemplary Use of the Bracelet

Optionally, the bracelet 10 is worn like a typical bracelet, by placing the wrist of the human in the band 12 and fastening the strap fastener 58 (if included) so that the band length 14 forms a loop 26 around the human's wrist. Prior to or after securing the bracelet 10 on his or her wrist, the user may place any desired object (e.g., a fan of turkey tail feathers 60, as in FIGS. 4-5, 8, 9, 12-13, or a hunting blind 62, as in FIG. 14) between the first and second clip arms 20,22. Optionally, the user may hold a weapon such as a bow or firearm.

The Stand

Figure 10:
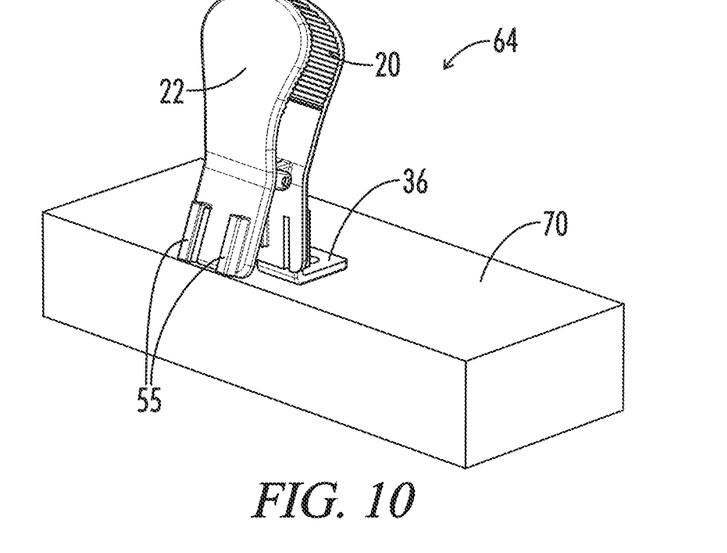
FIG. 10 illustrates a front perspective view of a stand of one embodiment of the invention resting on a mantel.
Figure 11:
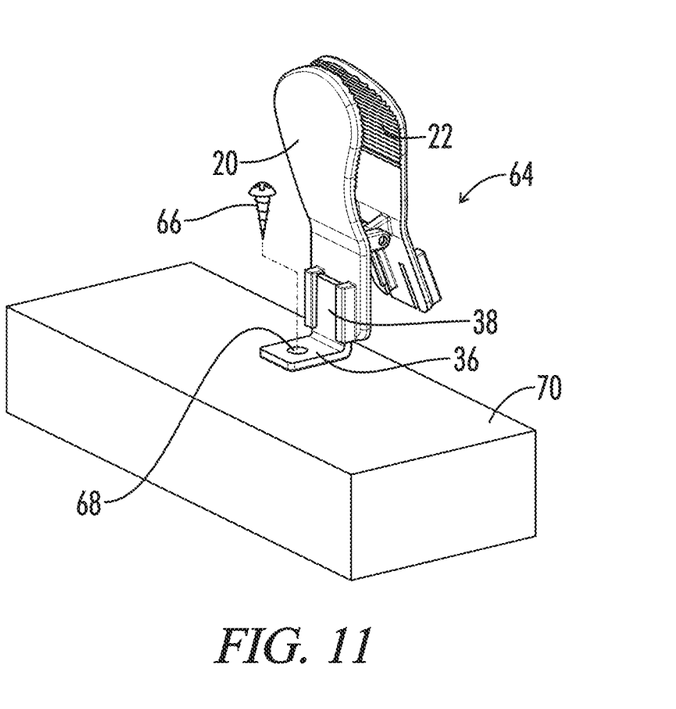
FIG. 11 illustrates a rear perspective view of the mantle and clip of FIG. 10.
Figure 12:
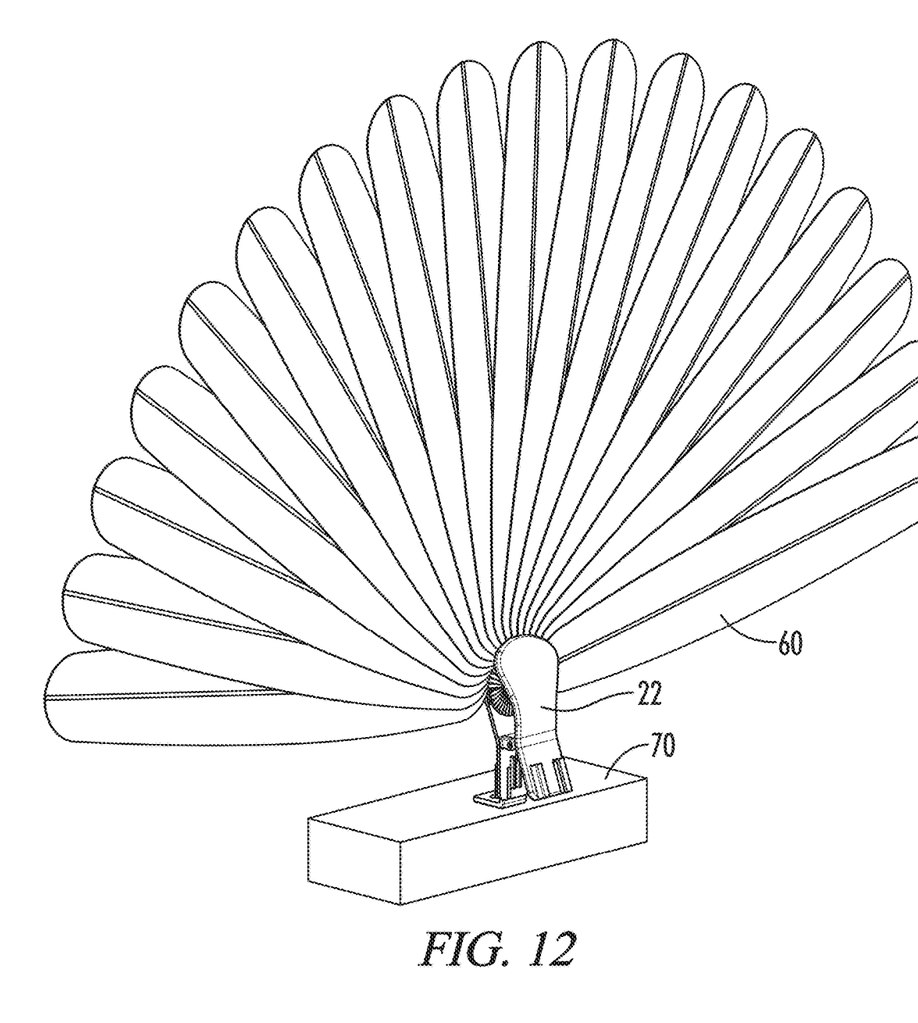
FIG. 12 illustrates a front perspective view of the mantle and clip of FIG. 10 with the clip holding a fan of turkey tail feathers.
Figure 13:
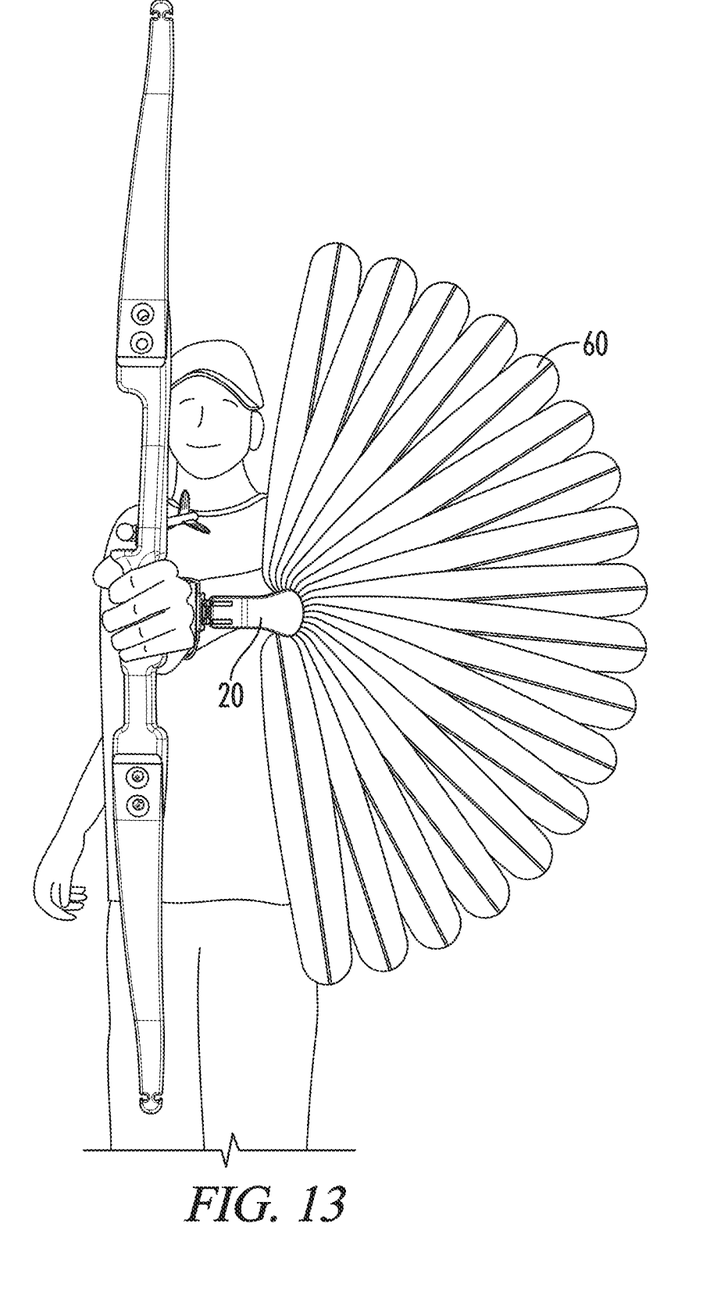
FIG. 13 illustrates a front perspective view of a person wearing a bracelet of one embodiment of the present invention with the clip holding a fan of turkey tail feathers and the person holding a bow.
Figure 14:
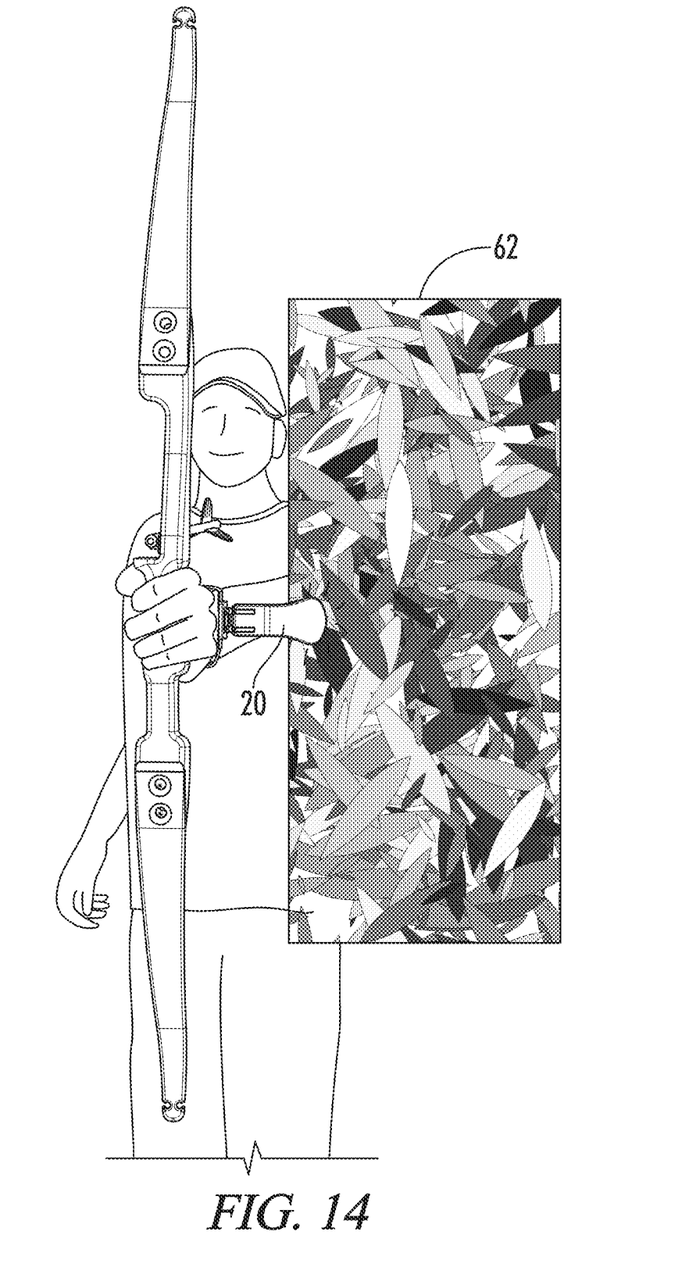
FIG. 14 illustrates a front perspective view of a person wearing a bracelet of one embodiment of the present invention with the clip holding a hunting blind and the person holding a bow.

Optionally, in lieu of a bracelet 10, the L-shaped bracket 30 and the clip 18 form a stand 64, as shown in FIGS. 10-11. More particularly, the horizontal arm 36 may further comprise a fastener hole 68 so that a bolt or other fastener 66 may be used to secure the horizontal arm 36 to a beam 70 such as a fireplace mantel. The clip 18 may then hold a fan of turkey tail feathers 60 or another object.

| Parts List | |
|---|---|
| Bracelet | 10 |
| Band | 12 |
| Band Length | 14 |
| Band Width | 16 |
| Clip | 18 |
| First Clip Arm | 20 |
| Second Clip Arm | 22 |
| Clip Fastener | 24 |
| Loop | 26 |

| Parts List -continued | |
|---|---|
| Glide Plate/bracket | 28 |
| L-Shaped Bracket | 30 |
| Glide Plate Aperture | 32 |
| Glide Plate Track | 34 |
| Horizontal Arm | 36 |
| Vertical Arm | 38 |
| Clip Arm Track | 40 |
| Pivot Arm/Moment Arm | 42 |
| Pivot Axis | 44 |
| Pivot Pin | 45 |
| Spring | 46 |
| First Clip Arm Top | 48 |
| Second Clip Arm Top | 50 |
| Strap | 52 |
| First Strap End | 54 |
| Second clip arm tracks | 55 |
| Second Strap End | 56 |
| Strap Fastener | 58 |
| Fan of Turkey Tail Feathers | 60 |
| Hunting Blind | 62 |
| Stand | 64 |
| Fastener | 66 |
| Fastener Hole | 68 |
| Beam | 70 |
| Glide plate rails | 72, 74 |
| Clip arm rails | 76, 78 |

Having now described the invention in accordance with the requirements of the patent statutes, those skilled in the art will understand how to make changes and modifications to the disclosed embodiments to meet their specific requirements or conditions. Changes and modifications may be made without departing from the scope and spirit of the invention. In addition, the steps of any method described herein may be performed in any suitable order and steps may be performed simultaneously if needed. Use of the singular embraces the plural.

Terms of degree such as "generally", "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

What is claimed is:

1. A method of using a bracelet, the method comprising the steps of:
   a) providing a bracelet comprising:
      i) a band configured to wrap around the wrist of a human user, the band having a band length, and a band width perpendicular to the band length;
      ii) a clip comprising a first clip arm and a second clip arm; and
      iii) a clip fastener attaching the clip to the band, the clip fastener comprising a glide plate and an L-shaped bracket, the glide plate comprising a glide plate aperture receiving the band and a glide plate track located lateral to the band, the glide plate configured to slide at least partially around the band length, the L-shaped bracket comprising a horizontal arm located in the glide plate track and a vertical arm extending away from the horizontal arm at an angle of approximately 90 degrees and connected to the clip;
   b) placing the wrist of the human in the band so that the band length forms a loop around the human's wrist and the clip extends away from the wrist and the loop.

2. The method of claim 1, wherein the clip extends away from the loop perpendicular to the band length.

3. The method of claim 1 wherein the glide plate track is oriented parallel to the band width.

4. The method of claim 1 wherein the first clip arm further comprises a clip arm track receiving the vertical arm.

5. The method of claim 1 wherein the clip fastener further comprises a pivot arm/moment arm pivotably connected to the L-shaped bracket and moveable about a pivot axis oriented perpendicular to the band width.

6. The method of claim 5 wherein the first clip arm further comprises a clip arm track receiving the pivot arm.

7. The method of claim 6 wherein the first clip arm and the second clip arm each comprises a top and further wherein the clip further comprises a spring biasing the second clip arm top toward the first clip arm top.

8. The method of claim 1 wherein the band is in the form of a strap and comprises a first strap end and a second strap end and further wherein the first strap end is releasably attached to the second strap end by a strap fastener.

9. The method of claim 1 further comprising placing a fan of turkey tail feathers between the first and second clip arms.

10. The method of claim 1 further comprising securing a hunting blind between the first and second clip arms.

11. The method of claim 1 wherein the clip fastener removably attaches the clip to the band.

12. The method of claim 1 wherein the band length is greater than the band width.

* * * * *